(12) United States Patent
Ikeya et al.

(10) Patent No.: US 7,094,960 B2
(45) Date of Patent: Aug. 22, 2006

(54) MUSICAL SCORE DISPLAY APPARATUS (75) Inventors: Tadahiko Ikeya, Hamamatsu (JP); Shinichi Ito, Hamamatsu (JP)

(73) Assignee: Yamaha Corporation, (JP)

( * ) Notice: Subject to any disclaimer, the term of this patent is extended or adjusted under 35 U.S.C. 154(b) by 102 days.

(21) Appl. No.: 10/876,932

(22) Filed: Jun. 25, 2004

(65) Prior Publication Data
US 2005/0016361 A1  Jan. 27, 2005

(30) Foreign Application Priority Data
Jun. 27, 2003 (JP) ............................. 2003-184390
Sep. 18, 2003 (JP) ............................. 2003-325935

(51) Int. Cl.
G09B 15/00 (2006.01)
G09B 15/02 (2006.01)
G09B 15/04 (2006.01)

(52) U.S. Cl. .................................. 84/471 R; 84/483.1

(58) Field of Classification Search ............. 84/470 R, 84/471 R, 477 R, 483.1
See application file for complete search history.

(56) References Cited

U.S. PATENT DOCUMENTS

| 6,062,867 A | * | 5/2000 | Torimura | 434/307 A |
| 6,072,114 A | * | 6/2000 | Kunimasa | 84/477 R |
| 6,235,979 B1 | | 5/2001 | Yanase | 84/477 R |
| 6,538,188 B1 | | 3/2003 | Kondo | 84/477 R |
| 6,545,208 B1 | * | 4/2003 | Hiratsuka | 84/476 |
| 6,582,235 B1 | | 6/2003 | Tsai et al. | 434/307 A |
| 2001/0023633 A1 | * | 9/2001 | Matsumoto | 84/478 |
| 2003/0051595 A1 | * | 3/2003 | Hasegawa | 84/637 |
| 2003/0192424 A1 | | 10/2003 | Koike | 84/477 |
| 2004/0244567 A1 | * | 12/2004 | Asakura | 84/613 |

* cited by examiner

Primary Examiner—Jeffrey W Donels
(74) Attorney, Agent, or Firm—Rossi, Kimms & McDowell, LLP (57) ABSTRACT

A musical score display apparatus reads note data and lyric data, and displays the read note data and lyric data on a displayed musical score. In the case where the lyric data are displayed to match the displayed note data, a position where character strings of the lyric data overlap is detected, and the display range of the note data and the lyric data which contains the detected position is extended. Further, the character strings of the lyric data are scrolled within the display range of the lyric data which contains the detected position. Thus, even when the character stings of the lyric overlap on the displayed musical score, a user can read the lyric without any special operation.

32 Claims, 8 Drawing Sheets

MUSICAL SCORE DISPLAY APPARATUS

BACKGROUND OF THE INVENTION

1. Field of the Invention

The present invention relates to a musical score display apparatus, and more particularly to a musical score display apparatus for displaying performance data with lyric data in the form of a musical score.

2. Description of the Related Art

Conventionally, there has been known an apparatus capable of displaying a musical score of attractive appearance on the basis of performance data such as MIDI data (see, for example, Japanese Patent Application Laid-Open (kokai) No. 11-327427). In such apparatus, when musical score display data are generated from performance data, the display width of each measure (bar) and the allocation of time positions of successive notes (intervals of notes) in each measure are controlled such that notes corresponding to events of different timings are not displayed in an overlapping condition.

Further, some performance data of such a type include event data (lyric data) representing corresponding song lyrics. Such lyric data also include timing data as in the case of note data, and are also displayed to match the musical score displayed on the basis of the note data.

However, in the above-described conventional apparatus, although, for note display, the width of each measure and intervals of notes are adjusted so as to prevent notes of different timings from overlapping on a displayed musical score, the adjustment is performed only for the purpose of eliminating overlap of notes, and overlap of lyrics is not taken into consideration. Therefore, in a location where the intervals of notes on the display screen are narrow, character strings of lyric data are often displayed in an overlapping condition.

A conceivable measure for coping with the above problem is use of a function of expanding the display screen in the time axis direction (the playback direction), which function is generally incorporated in such an apparatus. However, when such a function is used, the entire musical score is displayed with a constant enlargement ratio. Therefore, in a location where the density of notes is low from the beginning, and corresponding lyrics are displayed without overlap, the character intervals of the lyrics are increased excessively, which makes reading of the lyrics difficult.

SUMMARY OF THE INVENTION

In view of the foregoing, an object of the present invention is to provide a musical score display apparatus which can neatly display lyrics in addition to notes when the apparatus displays a musical score on the basis of performance data including not only note data but also lyric data.

In order to achieve the above object, the present invention provides a musical score display apparatus comprising: a musical score display portion for displaying, on a musical score, sections of a lyric represented by lyric data contained in performance data, together with notes represented by note data contained in the performance data such that the lyric sections and the notes are displayed in a mutually related manner; a section divider for dividing the musical score displayed by the musical score display portion into a plurality of sections in a time-axis direction; a section detector for detecting a section in which lyric sections would overlap each other when the lyric sections and the notes are displayed in the mutually related manner by the musical score display portion; and a display controller for controlling the display of the lyric sections and the notes performed by the musical score display portion, in such a manner that the lyric sections in the section detected by the section detector do not overlap.

Preferably, the musical score display apparatus further comprises a performance data storage device for storing the performance data, and a performance data read-out portion for reading out the performance data stored in the performance data storage device.

Preferably, the display controller extends the detected section to a degree such that the lyric sections in the section detected by the section detector do not overlap. More specifically, the display controller preferably comprises an extension ratio calculator for calculating an extension ratio for the detected section such that the lyric sections in the detected section do not overlap, and an extension controller for extending the detected section at the calculated extension ratio. In this case, the extension ratio calculator preferably calculates the extension ratio in accordance with a difference in timing and an amount of overlap between two adjacent lyric sections. Further, the extension ratio calculator may calculate by gradually increasing the extension ratio.

The present invention also provides a musical score display apparatus comprising: a musical score display portion for displaying a musical score consisting of notes represented by note data contained in performance data; a section divider for dividing the musical score displayed by the musical score display portion into a plurality of sections in a time-axis direction; a section detector for detecting a section, among the plurality of sections, which section includes lyric data sets which would produce an overlapping display of lyric sections when sections of a lyric represented by lyric data contained in the performance data are displayed while being related to the corresponding notes of the displayed musical score; and a display controller for controlling the display of the lyric sections in such a manner that the lyric sections in the section detected by the section detector do not overlap.

In this case, preferably, the musical score display portion comprises a note display controller for displaying the notes on the musical score in such a manner that the notes do not overlap. Further, preferably, the display controller comprises a note display controller for controlling the display of the notes in such a manner that the notes are displayed while being related to the corresponding lyric sections.

The present invention further provides a musical score display apparatus comprising: a section divider for dividing a displayed musical score into a plurality of sections in a time-axis direction when sections of a lyric represented by lyric data contained in performance data are displayed on the musical score; a section detector for detecting a section, among the plurality of sections, which section includes lyric data sets which would produce an overlapping display of lyric sections; a lyric display data creator for creating, for the lyric data contained in the detected section, lyric display data which eliminate the overlapping of the lyric sections; a note display data creator for creating, for note data contained in the performance data, note display data on the basis of the created lyric display data, the note display data being used to display notes while relating the same to the corresponding lyric sections; and a musical score display portion for displaying the lyric sections and the notes on the musical score in a related manner, by making use of the created lyric display data and note display data, in such a manner that the lyric sections do not overlap.

In this case, preferably, the lyric display data creator creates lyric display data in such a manner that the section detected by the section detector is extended to a degree such that the lyric sections in the detected section do not overlap. More specifically, the lyric display data creator comprises an extension ratio calculator for calculating an extension ratio for the detected section such that the lyric sections in the detected section do not overlap, and an extension controller for extending the detected section at the calculated extension ratio.

By virtue of these and other features of the present invention, in the case where a section in which lyric sections overlap is detected when lyric sections and notes are displayed in a related manner, display of the lyric sections and the notes is controlled in such a manner that the lyric sections in the detected section do not overlap. Accordingly, even when the character strings of the lyric sections overlap on the displayed musical score, a user can read the lyric sections without any special operation. Further, the lyric sections and notes can be displayed with good appearance.

The present invention further provides a musical score display apparatus comprising: a musical score display portion for displaying, on a musical score, sections of a lyric represented by lyric data contained in performance data, together with notes represented by note data contained in the performance data such that the lyric sections and the notes are displayed in a mutually related manner; an overlap position detector for detecting a position where lyric sections would overlap when the lyric sections are displayed to match the notes displayed by the musical score display portion; and a scroll controller for scroll-displaying a lyric section displayed at the position detected by the overlap position detector.

In this case, preferably, the scroll controller independently scrolls lyric sections in a plurality of sections of the musical score formed through division of the musical score. The musical score display apparatus further comprises a control object detector for detecting that the detected position has become a control object, wherein the scroll controller scrolls the lyric section displayed at the detected position in the case where the detected position has become a control object.

By virtue of the above feature of the present invention, in the case where overlapping lyric sections are detected when lyric sections and notes are displayed in a related manner, the detected lyric sections are scroll-displayed. Accordingly, even when the character strings of the lyric sections overlap on the displayed musical score, a user can read the lyric sections without any special operation. Further, the user can read the character strings of all the lyric sections without affecting the layout of the notes on the displayed musical score.

Moreover, the present invention is not limited to apparatuses for displaying a lyric, but can be practiced as a method or computer program for displaying a lyric.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT a. First Embodiment

Figure 1:
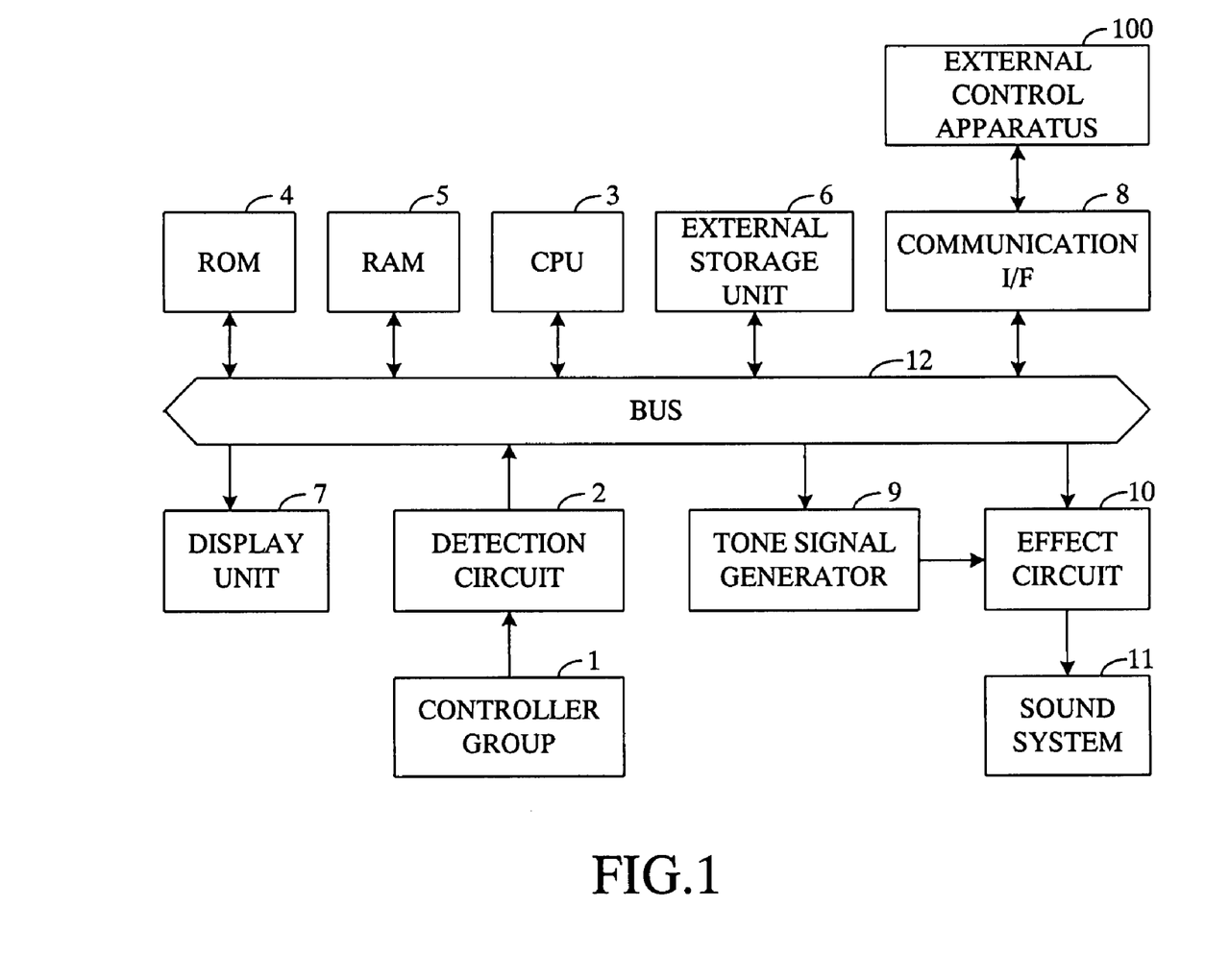
FIG. 1 is a block diagram schematically showing an electronic musical instrument equipped with a musical score display apparatus according to a first, second, or third embodiment of the present invention.

A first embodiment of the present invention will be described in detail with reference to the drawings. FIG. 1 is a block diagram schematically showing an electronic musical instrument equipped with a musical score display apparatus according to the first embodiment.

The electronic musical instrument includes a controller group 1, a detection circuit 2, a CPU 3, ROM 4, RAM 5, an external storage unit 6, a display unit 7, a communication interface (I/F) 8, and a tone signal generator 9.

The controller group 1 includes a plurality of controllers such as a performance controller (e.g., a musical keyboard), a keyboard for character input, a pointing device (e.g., a mouse), and various switches. The detection circuit 2 detects respective operation conditions of the controllers of the controller group 1. The CPU 3 controls operation of the electronic musical instrument. The ROM 4 stores control programs to be executed by the CPU 3, as well as various table data and other fixed data. The RAM 5 temporarily stores performance data, various types of input information, calculation results, etc. The external storage unit 6 stores various application programs, including the control programs, and various data, including various performance data, among others. The display unit 7 includes, for example, a liquid crystal display (LCD) and light-emitting diodes (LEDs), etc., and displays various types of information. The communication interface (I/F) 8 is connected to an external control apparatus 100 such as an external MIDI (Musical Instrument Digital Interface) apparatus, and exchanges data with the external control apparatus 100. The tone signal generator 9 converts the stored performance data or the like to a tone signal.

An effect circuit 10 and a sound system 11 are connected to the tone signal generator 9. The effect circuit 10 imparts various musical effects to the tone signal output from the tone signal generator 9. The sound system 11 includes a DAC (Digital-to-Analog Converter), amplifiers, speakers, etc. The sound system 11 converts the tone signal output from the effect circuit 10 to an acoustic signal, and outputs the acoustic signal. The above-mentioned structural components 2 to 10 are connected with one another via a bus 12.

Examples of the external storage unit 6 include a flexible disk drive (FDD), a hard disk drive (HDD), a CD-ROM drive, and a magneto-optical disk (MO) drive. As described previously, the control programs to be executed by the CPU 3 can also be stored in the external storage unit 6. In the case where the control programs are not stored in the ROM 4, the control programs are previously stored in the external storage unit 6, and are transferred to the RAM 5 so as to cause the CPU 3 to perform the same operation as in the case where the control programs are stored in the ROM 4. This facilitates addition of control programs and upgrading of the control programs.

In the illustrated example, the external control apparatus 100 is connected directly to the communication I/F 8. However, a server computer may be connected to the communication I/F 8 via a communication network such as a LAN (Local Area Network), the Internet, or a phone line. In the case where the above-described various programs and/or data are not stored in the external storage unit 6, the communication I/F 8 is used to download the various programs and/or data from the server computer. A computer (in the present embodiment, an electronic musical instrument) which serves as a client transmits a command to the server computer via the communication I/F 8 and the communication network in order to request download of a program or data. Upon receipt of the command, the server computer distributes the requested program or data to the computer via the communication network. The computer receives the program or data via the communication I/F 8, and stores the program or data in the external storage unit 6. Thus, the downloading is completed.

Figure 2A:
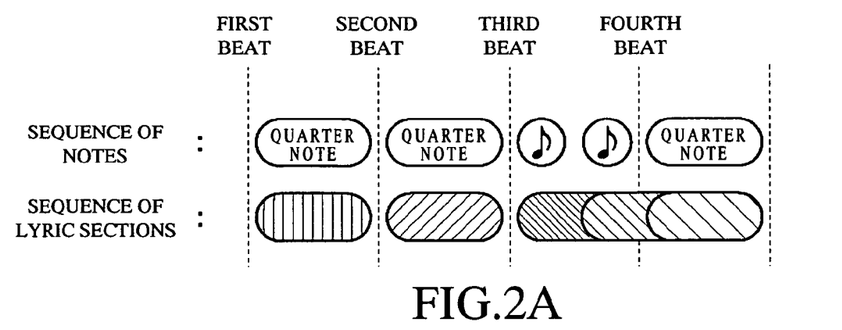
FIG. 2A shows an example of musical score which a conventional musical score display apparatus displays on the basis of performance data.
Figure 2B:
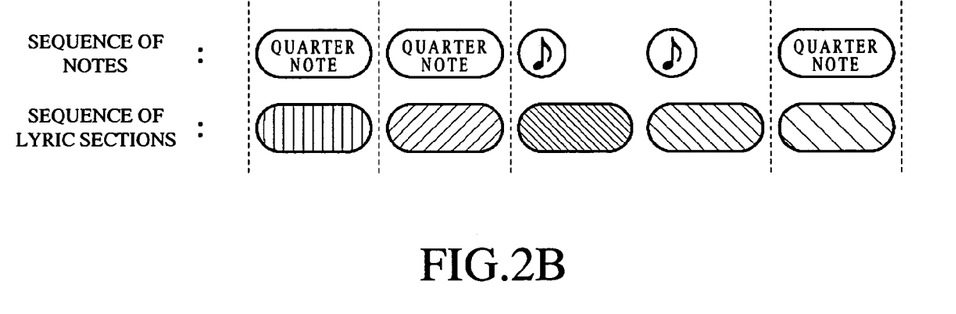
FIG. 2B shows an example of musical score which the musical score display apparatus according to the first or second embodiment displays on the basis of the same performance data.
Figure 3:
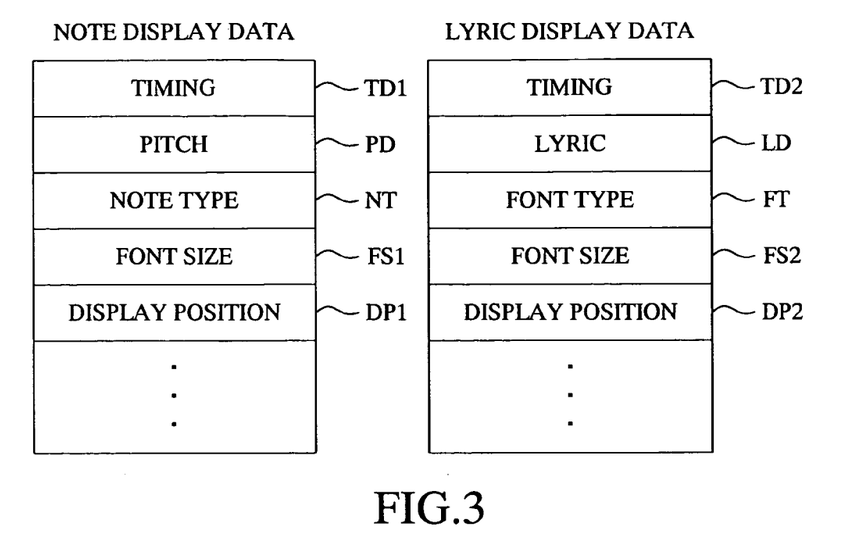
FIG. 3 shows example formats of note display data and lyric display data which are employed in the first, second, and third embodiments.
Figure 4A:
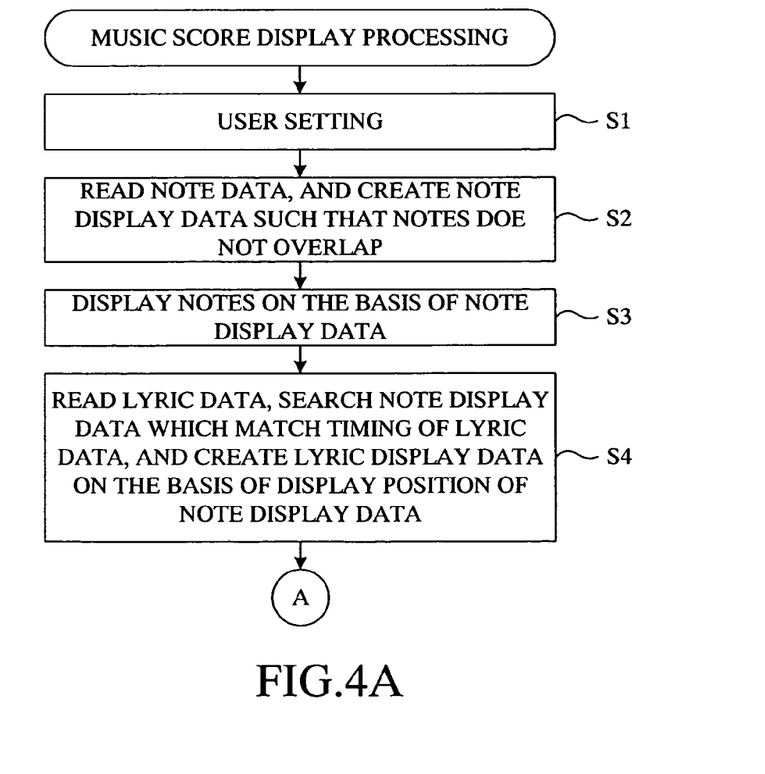
FIGS. 4A and 4B are flowcharts showing the steps of musical score display processing according to the first embodiment.
Figure 4B:
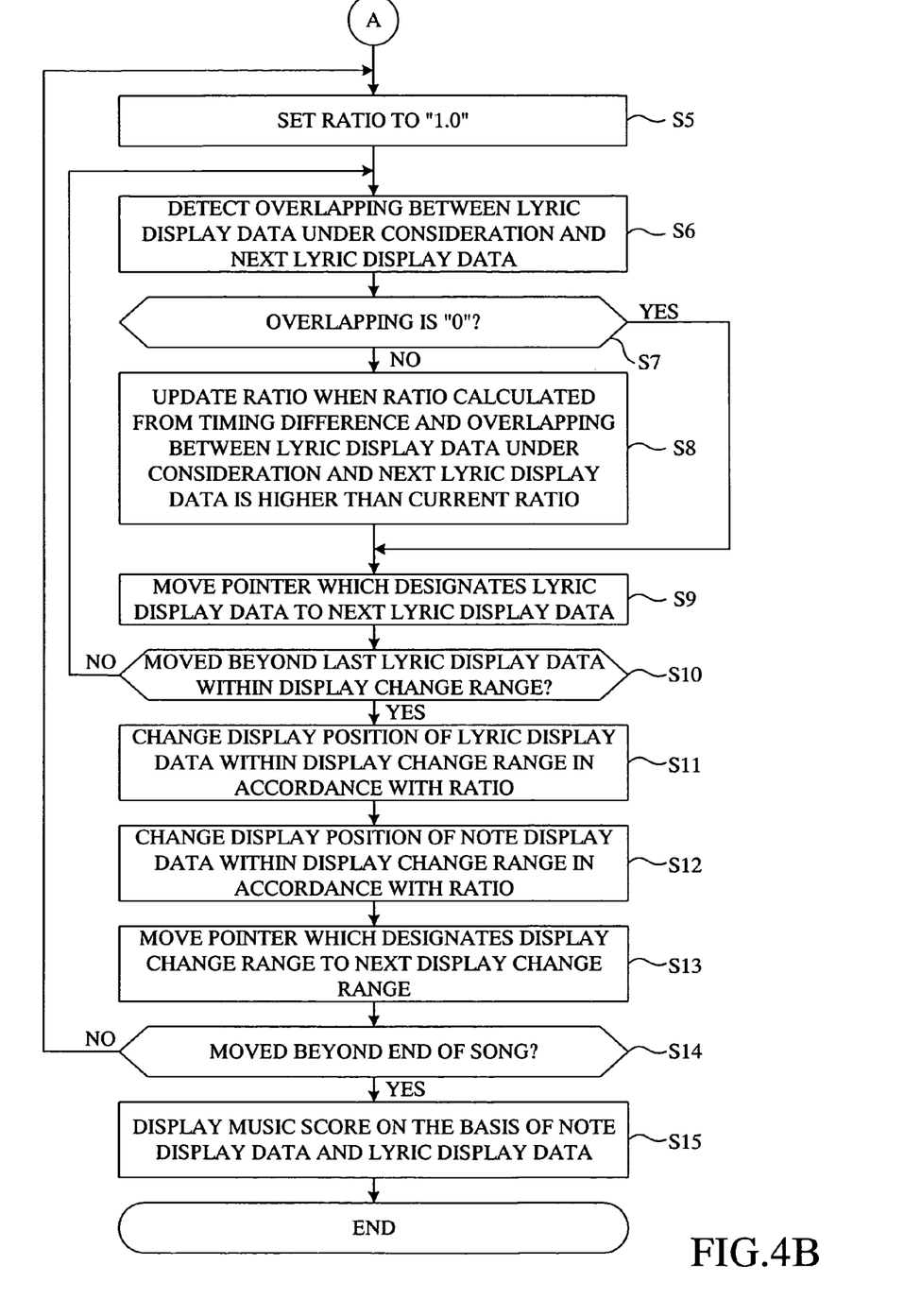

Control processing executed by the musical score display apparatus within the electronic musical instrument configured in the above-described manner will be first described in general terms with reference to FIGS. 2A, 2B, and 3, and then in detail with reference to FIGS. 4A and 4B.

FIGS. 2A and 2B show examples of musical score which a conventional musical score display apparatus and the musical score display apparatus according to the first embodiment respectively display on the basis of the same performance data. FIG. 2A can be seen to show a state in which the musical score display apparatus according to the first embodiment displays a musical score on which lyric sections are displayed on the basis of lyric display data (see FIG. 3) before being subjected to display control. However, in the first embodiment, before performance of display control, display of lyrics on the basis of lyric display data is not performed, although notes are displayed. Of course, the musical score display apparatus may have such a lyric display function.

FIGS. 2A and 2B depict a music score displayed on the basis of performance data of a certain measure, among supplied performance data; i.e., musical score data for which musical score display must be performed. As is understood from FIGS. 2A and 2B, the performance data of that measure is composed of a sequence of notes including a single quarter note at each of the first, second, and fourth beats, and two eighth notes at the third beat; and a lyric sequence related to the sequence of notes such that one or a plurality of characters correspond to a note.

In that measure, the note density at the third beat is higher than those at the remaining beats. Therefore, although a section of the lyric is disposed for each note, the lyric sections at the third beat are displayed in an overlapping manner as shown in FIG. 2A, because the length of a display area for each beat in the direction of the time axis is constant. Strictly speaking, the display area for the third beat is longer than that for the remaining beats by an amount corresponding to a difference in note density. However, the display area for the third beat is not long enough to display, in a non-overlapping manner, the respective lyric sections corresponding to the notes.

In view of the foregoing, the musical score display apparatus of the first embodiment detects a location where lyric sections are displayed in an overlapping condition, and extends the display area at the detected location in the time axis direction at an extension ratio at which the overlapping can be eliminated. The minimum unit of display areas to be subjected to extension control (hereinafter referred to as "display change ranges") is a single beat, for example. In this case, as shown in FIG. 2B, only the display area for the third beat is extended to a length double those of the display areas for the remaining beats, to thereby prevent overlapping of lyric sections. The reason why the length of the display area is made double is that a single display area for display of a single quarter note at a single beat is required to display a single lyric section consisting of a single or a plurality of characters of the lyric. However, an extension ratio smaller than two (e.g., 1.5) may be used, so long as the lyric sections do not overlap.

In order to display a musical score on the basis of performance data, the musical score display apparatus of the present embodiment generates, on the basis of the performance data, note display data for displaying notes, and lyric display data for displaying lyrics. Notably, fixed data for musical score display, such as those of staff notation and G clef, are previously stored in, for example, the above-mentioned ROM 4, and read out to be used for musical score display.

FIG. 3 shows example formats of the note display data and the lyric display data. One set of the note display data is provided for each note to be displayed. One set of the lyric display data is provided for each lyric section corresponding to a single note and consisting of a single or a plurality of characters.

As shown in FIG. 3, each set of the note display data includes timing data TD1, pitch data PD, note type data NT, font size data FS1, display position data DP1, and other data (not shown). The timing data TD1 represent a sound production timing of the corresponding note. The pitch data PD represent a pitch of the corresponding note. The note type data NT represent a type (quarter note, eighth note, etc.) of the corresponding note. The font size data FS1 represent a font size to be used to display the corresponding note. The display position data DP1 represent a display position on the musical score at which the corresponding note is displayed. The other data include data representing a display color of the corresponding note, and data for determining an ornament, if any, to be imparted to the corresponding note.

In general, the timing data TD1 and the pitch data PD are contained in performance data irrespective of the format of the performance data. Therefore, these data can be obtained directly from the performance data. In some cases, the note type data NT are not contained in the performance data. However, since data representing sound production durations are generally contained in the performance data, the note type data NT can obtained from the data of sound production durations through simple calculation. The font size data FS1 and the display color data may be previously set by a user. In such a case, the font size data FS1 and the display color data can be obtained through reading of the previously set data. In the case where these data have not been previously set by the user, the font size data FS1 and the display color data can be obtained through reading of corresponding default values.

The display position data DP1 are first calculated on the basis of the timing data TD1. Subsequently, through use of a musical score allocation method disclosed in, for example, Japanese Patent Application Laid-Open (kokai) No. 11-327427, re-layout (modification of the number of relevant measures and measure width, and re-layout of beats and notes) is performed for notes which would otherwise be displayed in an overlapping condition when the calculated display position data are used. The description of Japanese Patent Application Laid-Open No. 11-327427 is herein incorporated by reference. The calculated display position data are updated on the basis of results of the re-layout. Notably, such update may be unnecessary in some cases.

Each set of the lyric display data includes timing data TD2, lyric data LD, font type data FT, font size data FS2, display position data DP2, and other data (not shown). The timing data TD2 represent a generation timing of the corresponding lyric section. The lyric data LD represent the contents (a single character or a plurality of characters) of the corresponding lyric section. The font type data FT represent a type (Ming type, Gothic type, etc.) of a font to be used to display the corresponding lyric section. The font size data FS2 represent a font size to be used to display the corresponding lyric section. The display position data DP2 represents a display position on the musical score at which the corresponding lyric section is displayed. The other data include data representing a display color of the lyric.

In general, the timing data TD2 and the lyric data LD are contained in the performance data irrespective of the format of the performance data. Therefore, these data can be obtained directly from the performance data. The font type data FT, the font size data FS2, and the display color data may be previously set by a user. In such case, the font type data FT, the font size data FS2, and the display color data can be obtained through reading of the previously set data. In the case where these data have not been previously set by the user, the font type data FT, the font size data FS2, and the display color data can be obtained through reading of corresponding default values. The display position data DP2 can be calculated on the basis of the timing data TD2 and the display position data (after update) DP1 of the note display data.

FIG. 2A shows an example of musical score of a certain measure displayed by use of the thus-generated note display data and lyric display data. In a display area having a high note density, lyric sections may be displayed in an overlapping condition. In view of the above, according to the feature of the present invention, lyric sections to be displayed are subjected to re-layout for preventing overlapping display of lyric sections.

Next, the control processing will be described in detail. FIGS. 4A and 4B are flowcharts showing the steps of musical score display processing performed by the musical score display apparatus of the first embodiment; in particular, the CPU 31. The musical score display processing mainly consists of the following processings.

(1) User setting processing
(2) Note-display-data generation and display processing
(3) Lyric-display-data generation processing
(4) Musical score display processing These processings will be described successively.

The user setting processing in (1) above corresponds to step S1. Examples of the user setting processing include processing, performed when a user selects performance data for which musical score display is to be performed, for reading the selected performance data from, for example, the external storage unit 6 and storing the data in a performance data storage area secured in the RAM 5; and processing for setting a display change range (e.g., any one of "single measure, "single beat," and "single note"), a display color, a size of display fonts, and a type of display fonts for lyric.

The note-display-data generation and display processing in (2) above corresponds to steps S2 and S3. In step S2, data regarding notes (note data) are extracted from the performance data stored in the performance data storage area. Subsequently, the note data are processed by the above-described conventional musical score allocation method so as to generate note display data such that when notes are displayed, adjacent notes do not overlap each other. In step S3, a musical score is displayed on the basis of the note display data. In the musical score display, only the notes are displayed on a staff notation, and the lyric is not displayed. Of course, the musical score display processing may be modified through elimination of the processing in step S3 and addition of processing for "display on the basis of note display data and lyric display data" to be performed after the processing in step S4, which will be described later. In this case, as shown in FIG. 2A, notes are displayed in a non-overlapping condition on the staff notation, and lyric sections are displayed in a partially overlapping condition on the staff notation. In the musical score display in step S3, needless to say, there are displayed a staff notation, a G clef, etc., which are commonly displayed in any musical score display. As described previously, this display is performed on the basis of data read out from the ROM 4.

Since the feature of the present invention does not reside in generation of such note display data from the performance data, detailed description therefor is omitted. The note display data are generated by use of the musical score allocation method disclosed in Japanese Patent Application Laid-Open No. 11-327427; that is, a known musical score allocation method. The method disclosed in Japanese Patent Application Laid-Open No. 11-327427 is merely an example of the musical score allocation method. Any method may be employed, so long as the selected method can generate note display data such that when notes are displayed, adjacent notes do not overlap each other.

The lyric-display-data generation processing in (3) above corresponds to steps S4 to S14. In step S4, lyric data are first extracted from the selected performance data. Next, note display data that match the timing of the lyric data are searched, and lyric display data are created for the note display data. In step S5, the extension ratio to be used for extending a display change range is set to "1.0" (initial setting).

In step S6, the entire musical score display range is divided into a plurality of display change ranges. For each set of lyric display data contained in each display change range, a determination is made as to whether the set of lyric display data overlaps another set of lyric display data at a next location when they are displayed. When overlapping is detected, in step S8, an extension ratio at which these data sets do not overlap; i.e., an extension ratio of the relevant display change range is determined on the basis of the timing difference and the amount of overlap between the lyric display data set under consideration and the next lyric display data set. When the thus-determined extension ratio is higher than the currently set ratio (hereinafter referred to as the "current ratio"), the current ratio is updated to the newly determined ratio. When no overlap is detected, no processing is performed. After the processing in steps S6 to S8 is performed for all the lyric display data sets in the display change range under consideration (steps S9→S10→S6), in step S11, the display positions of all the lyric display data sets in the display change range under consideration are changed in accordance with the current ratio. In step S12, the display positions of all the note display data sets in the display change range under consideration are changed in accordance with the current ratio. The processing in steps S5 to S12 is performed for all the display change ranges (steps S13→S14→S5).

In the overlap detection processing in step S6, the display width of a relevant lyric section is calculated on the basis of the font size data of the lyric display data under consideration, and the distance (display interval) between the relevant lyric section and a subsequent lyric section is calculated on the basis of the display position data of the lyric display data under consideration and the display position data of the next lyric display data. When the calculated display width is greater than the calculated distance, presence of an overlap is detected. The method for overlap detection is not limited to the above-described method. Any method for overlap detection may be employed. Further, during the overlap detection, in some cases, an overlap with a beat separation or a measure line is detected in place of an overlap with the next lyric section. This may improve the appearance of the displayed musical score.

As described previously, each display change range may be set to a "singe note." In this case, the operation of calculating an extension ratio and extending a relevant display change range on the basis of the calculated ratio is not required; the only required operation is an operation of changing or moving the display position of the next lyric section to a position such that the lyric section under consideration does not overlap the next lyric section. At this time, the display position of a note corresponding to the next lyric section is also changed in accordance with the changed display position of the next lyric section.

The musical score display processing in (4) above corresponds to step S15. In step S15, a musical score is displayed on the basis of the note display data and the lyric display data, which have been generated in the above-described manner.

In the lyric-display-data generation processing, the note data are processed by the above-described conventional musical score allocation method so as to generate note display data such that no overlap is produced between displayed notes; i.e., adjacent notes do not overlap each other. Subsequently, the note display data are used as the basis for detecting any overlap of lyric sections that would be produced when the lyric display data are displayed on the basis of the note display data. After that, on the basis of the detection result, note display data are generated such that no overlap is produced between displayed lyric sections. Then, the note display data are modified in accordance with the lyric display data. However, the lyric-display-data generation processing is not limited to the above method, and the following method may be employed. First, data regarding a lyric (lyric data) are extracted from performance data; and on the basis of timing data contained in the lyric data, lyric display data are created. Subsequently, any overlap that would be produced when lyric sections are displayed on the basis of the lyric display data is detected, and on the basis of the detection result, the lyric display data are modified such that no overlap is produced between displayed lyric sections. Then, note display data are generated on the basis of the lyric display data. The processing in this case can be realized simply, through removal of the processing in steps S2 and S3, modification of the processing in step S4 to "processing for reading lyric data and creating lyric display data in accordance with timings of the lyric data," and modification of the processing in step S12 to "processing for crating note display data in accordance with the lyric display data."

As described above, in the first embodiment, the entire musical score display range is divided into a plurality of display change ranges. Subsequently, for each set of lyric display data contained in each display change range, a determination is made as to whether the set of lyric display data would overlap another set of lyric display data at a next location when they are displayed. When display overlapping is detected, only the relevant display change range is extended in such a manner that the display overlapping is eliminated. With regard to the remaining display change ranges in which no display overlapping is detected, the musical score display therefor is not changed. Therefore, not only the notes but also the lyric sections can be displayed with attractive appearance.

In the first embodiment, the ratio at which a relevant display change range is extended is held constant throughout the relevant display change range. However, the ratio may be changed depending on positions within the relevant display change range. In this case, the musical score display apparatus may be configured to allow a user to freely set the degree of ratio change.

b. Second Embodiment

Next, a musical score display apparatus according to a second embodiment of the present invention will be described. The musical score display apparatus according to the second embodiment employs the musical score display processing shown by means of a flowchart of FIG. 5, in place of the musical score display processing shown by means of flowcharts of FIGS. 4A and 4B. Since other structural features are identical with those of the first embodiment, their descriptions are omitted. The musical score display processing shown by means of the flowchart of FIG. 5 differs from the musical score display processing shown by means of the flowcharts of FIGS. 4A and 4B in the method for performing the lyric-display-data generation processing described in (3) above. Therefore, in the following description, only this difference will be described. Notably, steps of FIG. 5 identical with those of FIGS. 4A and 4B are denoted by the same step numbers.

Figure 5:
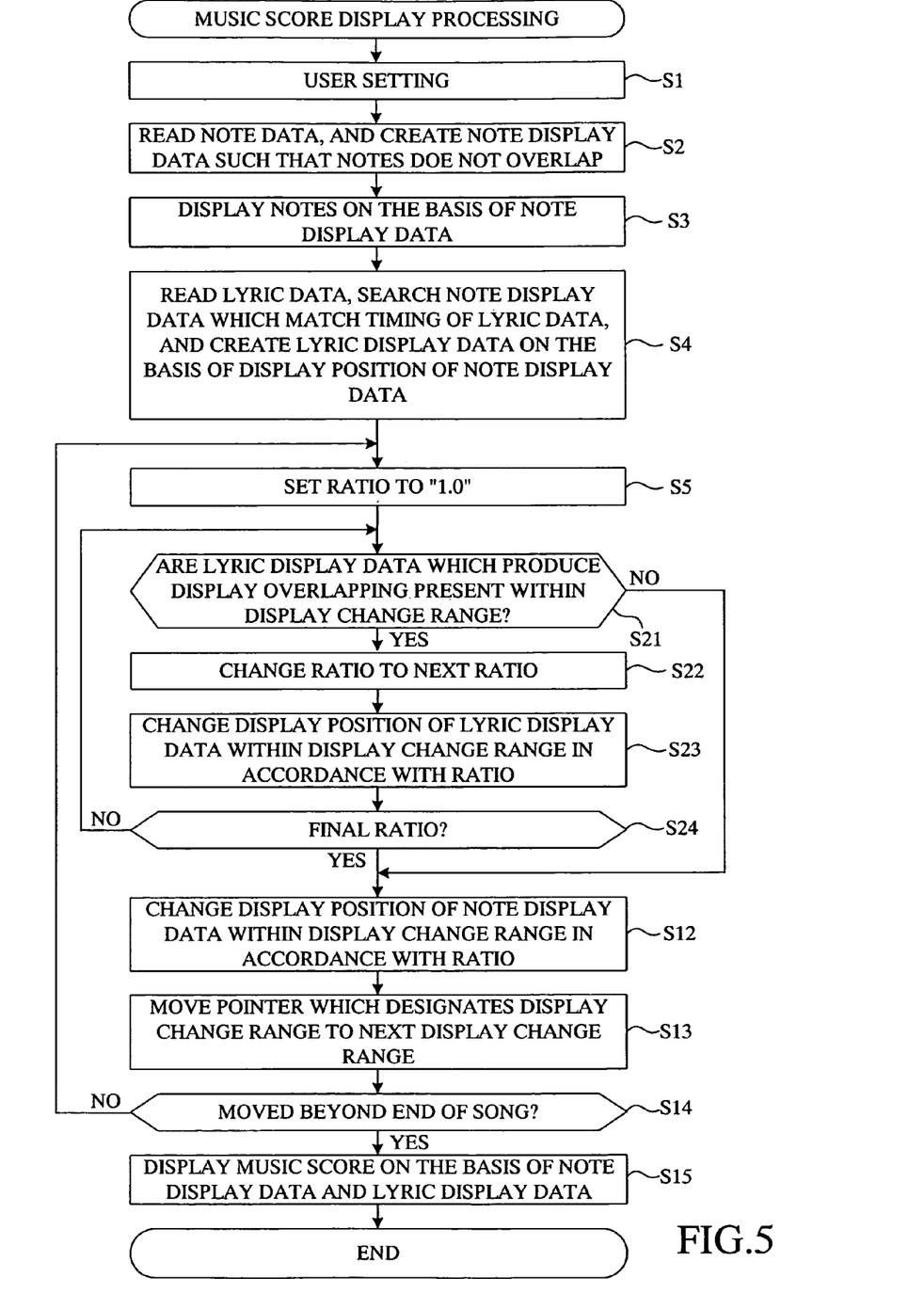
FIG. 5 is a flowchart showing the steps of musical score display processing according to the second embodiment.

In FIG. 5, the lyric-display-data generation processing corresponds to steps S5 to S14. Among these steps S5 to S14, steps whose step numbers differ from those of FIGS. 4A and 4B; i.e., steps S21 to S24, provide processing which differs from the corresponding portion of the lyric-display-data generation processing of FIGS. 4A and 4B.

In this case, in step S21, for each set of lyric display data contained in a display change range, a determination is made as to whether the set of lyric display data produces display overlapping. When any one of the lyric display data sets produces display overlapping, in step S22, the extension ratio for the display change range is changed to an extension ratio one step higher. In step S23, in accordance with the changed extension ratio, the display positions of all the lyric display data sets within the display change range are changed. When the currently set extension ratio is not a final ratio, for each set of lyric display data contained in the display change range, a determination is made as to whether the set of lyric display data produces display overlapping, on the basis of the changed display positions of the lyric display data sets (steps S24→S21). Until all the lyric display data sets in the display change range are modified in their display positions to eliminate display overlapping, the display positions of all the lyric display data sets within the display change range are changed (steps S24→S21→S12) while the extension ration is increased stepwise. However, in the event that the stepwise increased extension ratio reaches the final ratio, even when some lyric display data sets within the display change range produce display overlapping, the ratio is not increased further, and the lyric display data sets are displayed as they are in a slightly overlapping manner (steps S24→S12).

As described above, the lyric-display-data generation processing of the second embodiment differs from that of the first embodiment shown in FIGS. 4A and 4B only in the point that the ratio at which a relevant display change range is extended is increased stepwise. Accordingly, with an increase in the extent of each step of the ratio increase, a slight difference arises between a musical score displayed after performance of the lyric-display-data generation processing of the present embodiment and a musical score displayed after performance of the lyric-display-data generation processing of FIGS. 4A and 4B. However, with a decrease in the extent of each step of the ratio increase, the difference can be reduced to an ignorable level.

Notably, the musical score display apparatus of the present embodiment may be modified in such a manner that the steps of the ratio increase are fixedly set in advance, and a user cannot select them. Further, the musical score display apparatus may be configured in such a manner that a plurality of ratio lists including a plurality of ratios are set in advance, and a user can select one of the lists. In this case, the musical score display apparatus may be configured to allow the user to edit the selected list. Moreover, the musical score display apparatus may be configured in such a manner that no ratio list is prepared, and a user can set the ratios by inputting them. In the case where a user selects or edits a ratio list, processing for selecting one of a plurality of ratio lists must be performed. This processing may be performed during the user setting processing in step S1 of FIG. 5.

In the second embodiment as well, the ratio may be changed depending on positions within the relevant display change range. In this case, the musical score display apparatus may be configured to allow a user to freely set the extent of ratio change.

c. Third Embodiment

Figure 6A:
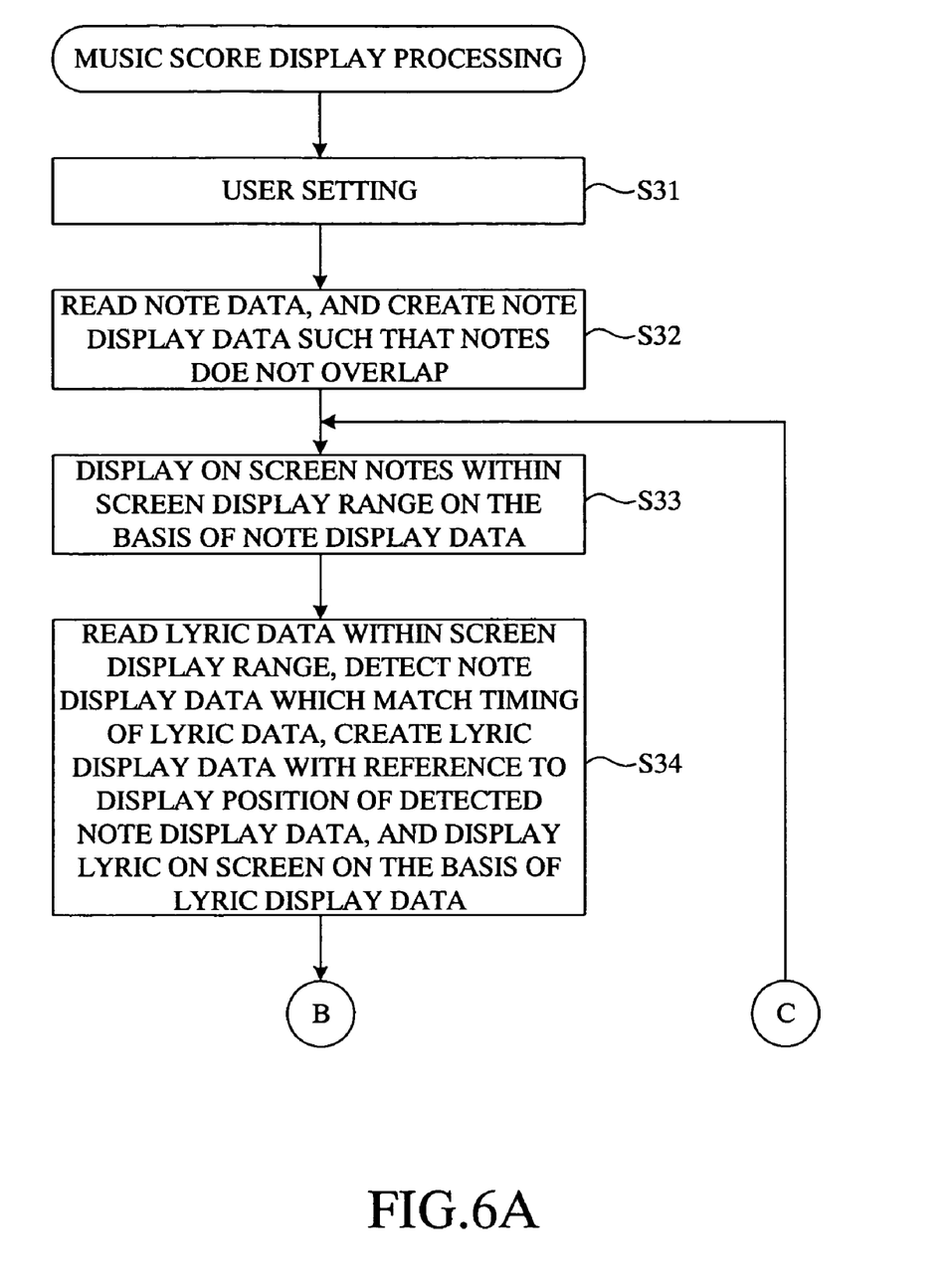
FIGS. 6A and 6B are flowcharts showing the steps of musical score display processing according to the third embodiment.

Next, a musical score display apparatus according to a third embodiment of the present invention will be described. The musical score display apparatus according to the third embodiment employs the musical score display processing shown by means of flowcharts of FIGS. 6A and 6B, in place of the musical score display processing shown by means of flowcharts of in FIGS. 4A and 4B. Since other structural features are identical with those of the first embodiment, their repeated descriptions are omitted. FIGS. 7A to 7C show example display screens which are displayed by means of the musical score display processing according to the third embodiment. The musical score display processing of FIGS. 6A and 6B will be described in detail with reference to the display screens shown in FIGS. 7A to 7C.

When the musical score display processing is started, in step S31, user setting is performed. Examples of the user setting include selection of performance data for which musical score is to be displayed, setting of a scroll display range (position) SDR, setting of a scroll mode, a musical score range (screen display range) DR to be displayed on an initial screen, etc.

The scroll display range (position) SDR is a range which represents start and end points of a range in which a character string of lyric data is scrolled, and is set in the unit of measure, beat, or note. For example, when a single measure is set as the scroll display range, the character string of lyric data within a single measure undergoes scroll display. Notably, the term "scroll display" used in relation to the third embodiment refers to an operation of successively displaying all the lyric data within the scroll display range at a designated location by moving the character string of the lyric data in the vertical or horizontal direction. Further, in addition to the operation of displaying the character string by moving it vertically or horizontally, other operations which can successively display all the lyric data by displaying the same on a portion-by-portion basis are also called as "scroll display."

In the third embodiment, two scroll modes are provided. In the first mode (reproduction scroll mode), when a reproduction position RP is located within a scroll display range SDR (or a scroll display range SDR is located within a reproduction range RTR), the character string of lyric data within the scroll display range SDR is subjected to scroll display. In the second mode (normal scroll mode), scroll display is performed for all the scroll display ranges SDR within a screen display range DR, irrespective of current reproduction position.

The reproduction position RP represents a current reproduction position, and moves as the reproduction proceeds. The reproduction range RTR is a certain range which can be freely set by a user and specifies a portion of performance data to be reproduced. In the third embodiment, ranges, other than those set for reproduction of sound from performance data; e.g., ranges selected for editorial operation, are set as a reproduction range RTR. That is, even when performance data are not actually reproduced (to produce sound), a sequence of lyric sections within a scroll display range SDR corresponding to a portion selected as a reproduction range RTR is subjected to scroll display.

In step S32, performance data (note data) stored in, for example, the external storage unit 6 are read. Subsequently, in the same manner as in the first embodiment, note display data (see FIG. 3) are generated such that notes do not overlap each other. The thus-generated note display data are temporarily stored in a reproduction buffer provided in the RAM 5.

In step S33, notes within the current screen display range DR are displayed on the display screen of the display unit 7 on the basis of the note display data generated in step S32.

In step S34, lyric data within the current screen display range DR are extracted from the performance data; and note display data that match the timing of the lyric data are detected. Subsequently, with reference to the display position data DP1 of the detected note display data, lyric display data are generated. Then, a character string of the lyric is displayed on the display screen of the display unit 7 on the basis of the lyric display data.

When this step S34 is performed, the sequence of notes and the sequence of lyric sections are displayed on the display screen in a state shown in FIG. 7A. That is, the sequence of notes within the screen display range DR are arranged in such a manner that notes at different timings do not overlap; and the lyric sections to be displayed at the same timing as that of the corresponding notes are displayed under the corresponding notes. At this stage, the sequence of lyric sections are displayed in accordance with the display of the sequence of notes, and overlapping of lyric sections, etc. is not taken into consideration. Therefore, some lyric sections may be displayed with overlapping.

Figure 6B:
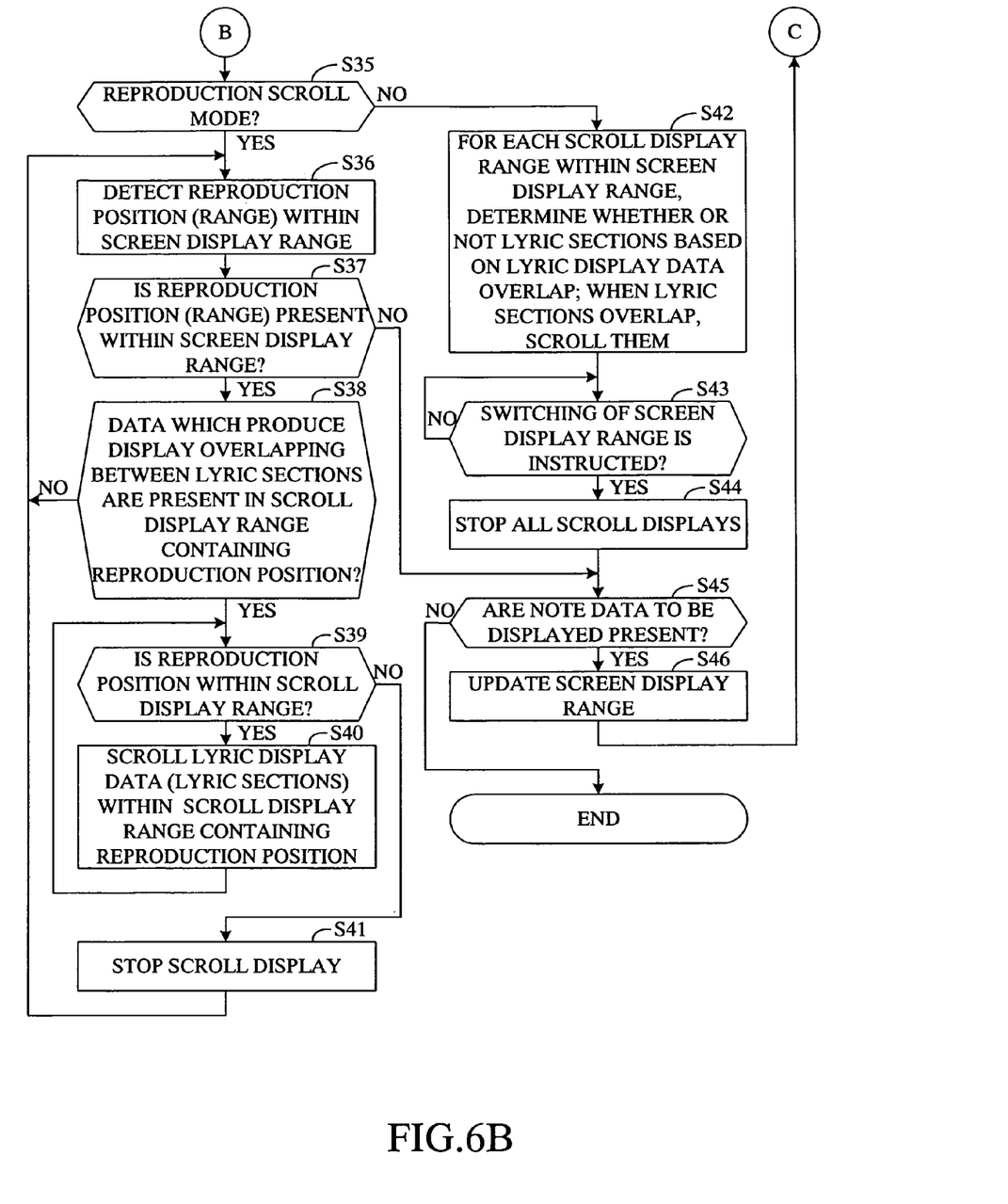
Figure 7A:
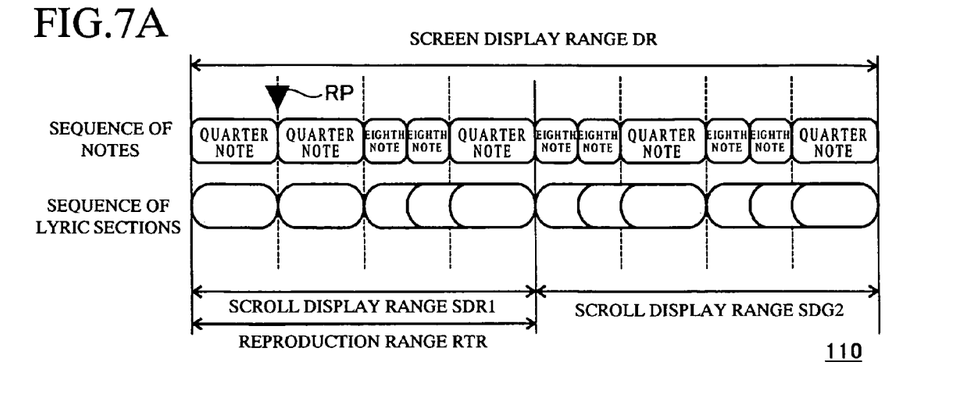
FIGS. 7A to 7C are examples of musical score which the musical score display apparatus according to the third embodiment displays on the basis of performance data.
Figure 7B:
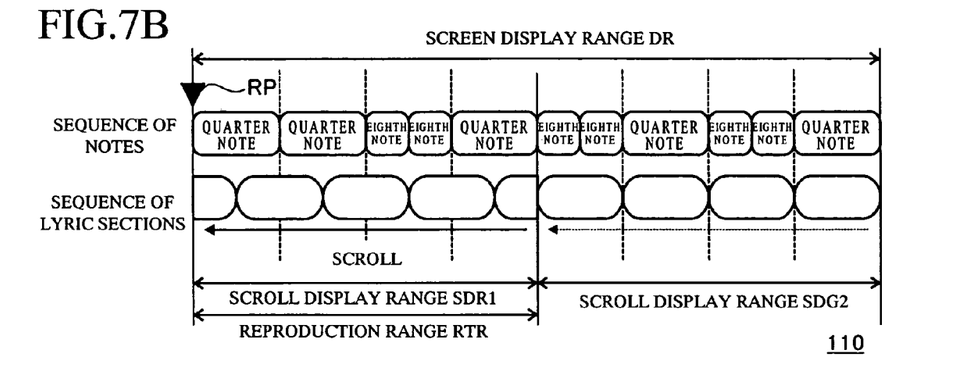
Figure 7C:
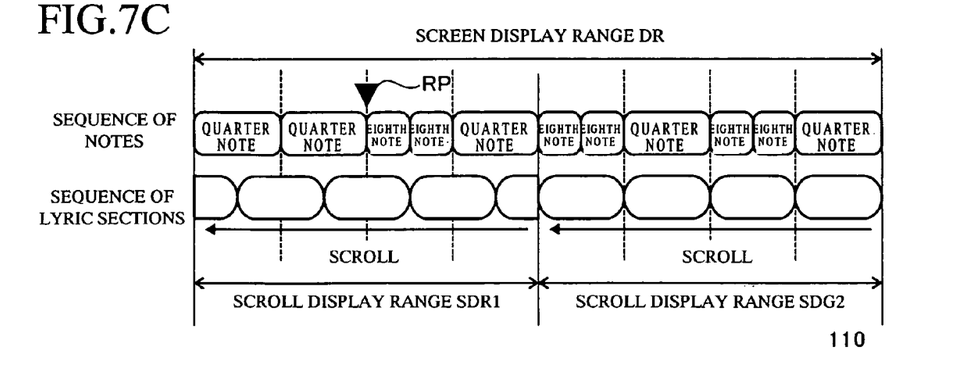

In step S35 of FIG. 6B, a determination is made as to whether or not the presently set scroll mode (that is, the scroll mode set in step S31) is the reproduction scroll mode. When the presently set scroll mode is the reproduction scroll mode, the program proceeds to step S36. When the presently set scroll mode is the normal scroll mode, the program proceeds to step S42.

In step S36, a reproduction position RP (or a reproduction range RTR) within the screen display range DR is detected. In step S37, a determination is made as to whether or not the reproduction position RP (or the reproduction range RTR) is present within the screen display range DR. When the reproduction position RP (or the reproduction range RTR) is present within the screen display range DR, the program proceeds to step S38. When the reproduction position RP (or the reproduction range RTR) is not present within the screen display range DR, the program proceeds to step S45.

In step S38, with reference to display position data DP2 contained in a plurality of lyric display data sets within the scroll display range SDR containing the reproduction position RP (or located within the reproduction range RTR), a determination is made as to whether the plurality of lyric display data sets contain lyric display data sets which would produce an overlapping display of the lyric (lyric sections). When lyric display data sets which would produce an overlapping display of lyric sections are present; for example, when lyric sections overlap with a resultant failure to display all the characters (e.g., at the third beat in the scroll display range SDR1 of FIG. 7A), the program proceeds to step S39. When no lyric sections overlap, the program returns to step S36.

In step S39, a determination is made as to whether the reproduction position RP is present within the scroll display range SDR1 or the scroll display range SDR1 is present within the reproduction range. When the reproduction position RP is present within the scroll display range SDR1 (the scroll display range SDR1 is present within the reproduction range), the program proceeds to step S40. When the reproduction position RP is not present within the scroll display range SDR1 (the scroll display range SDR1 is not present within the reproduction range), the program proceeds to step S41.

In step S40, the lyric display data sets within the scroll display range SDR1 containing the reproduction position RP (or located within the reproduction range RTR) are successively scroll-displayed within the scroll display range SDR1 in a circulating manner. Subsequently, the program returns to step S39. That is, during a period between the start and end of reproduction of the scroll display range SDR1, the sequence of lyric sections within the scroll display range SDR1 are scroll-displayed. FIG. 7B shows the display screen at this point in time.

In step S41, since the reproduction of the current scroll display range SDR1 has ended (or the reproduction range RTR has moved to the outside of the scroll display range SDR1), the scroll display of the scroll display range SDR currently subjected to scroll display is stopped. After that, the program returns to step S36.

As a result of the processing in steps S36 to S41 as described above, during the reproduction of the performance data of the scroll display range SDR1, the sequence of lyric sections within the scroll display range SDR1 are scroll-displayed. Then, upon completion of the reproduction of the performance data of the scroll display range SDR1, the reproduction position RP moves to a scroll display range SDR2, and the sequence of the lyric sections of the scroll display range SDR2 are scroll-displayed.

In step S42, for each scroll display range SDR within the screen display range DR, whether or not the plurality of lyric display data sets contain lyric display data sets which would produce an overlapping display of lyric sections is determined with reference to display position data DP2 contained in the lyric display data sets. When lyric display data sets which would produce an overlapping display of lyric sections are present, the lyric display data sets within the relevant scroll display range SDR are successively scroll-displayed within the scroll display range SDR in a circulating manner. In the example shown in FIG. 7C, within each of the scroll display ranges SDR1 and SDR2 contained in the screen display range DR, the corresponding sequence of lyric sections are scroll-displayed.

In step S43, a switching instruction for switching the screen display range DR is detected. Examples of the switching instruction include an instruction for updating the screen to follow the progress of reproduction of performance data (movement of the reproduction position to the outside of the screen display range), and a screen switching instruction input by the user. When a switching instruction is detected, in step S44, all the scroll displays are stopped. When no switching instruction is detected, the processing in step S43 is repeated.

In step S45, a determination is made as to whether note data to be displayed next (note display data not yet having been displayed) are present in the note display data produced in step S32. When note data to be displayed are present, in step S46, the screen display range DR is updated. Subsequently, the program returns to step S33. When note data to be displayed are not present; i.e., when the musical score display for the selected performance data is completed, the musical score display processing is ended.

In the third embodiment that operates as described above, when a sequence of lyric sections displayed to match the display of notes of a musical score overlap, a portion where lyric sections overlap is automatically scrolled. Therefore, all the lyric sections are displayed. Further, when lyric sections are scrolled, a user can scroll only the lyric sections contained in a portion currently being reproduced or edited. Moreover, through mode selection, the user can scroll all the lyric sections displayed on the screen irrespective of the reproduction position or the like.

In the third embodiment, the note display having been adjusted to prevent overlapping of notes at different timings is maintained unchanged; a sequence of lyric sections are arranged to match the note display; and lyric sections which would otherwise be displayed in an overlapping condition are scroll-displayed. Therefore, the musical score display can be maintained easily viewable.

In the third embodiment as well, the expression "lyric sections overlap" encompasses not only the case where adjacent sections of a lyric overlap each other, but also the case where a lyric section overlaps a beat separation or a measure line (a lyric section cannot be accommodated within a predetermined section).

The musical score display apparatus of the present embodiment may be modified in such a manner that when a lyric is displayed completely as a result of, for example, enlargement display of a musical score, scroll display is stopped. Further, the musical score display apparatus be modified to scroll the displayed musical score itself. In this case, a corresponding lyric can be scrolled independently of the musical score.

The number of and speed of scrolling operations may be set by a user. Further, the number of and speed of scrolling operations may be automatically set on the basis of musical score display width and reproduction tempo. Notably, in the third embodiment, a step for mode determination is provided. However, the operation mode may be fixed to either of the above-described modes.

d. Other Embodiments

The present invention is not limited to the above-described first through third embodiments, and when the present invention is put into practice, the embodiments can be modified in various manners without departing from the scope of the present invention.

For example, no limitation is imposed on the format of performance data, and any format may be employed, so long as the employed format enables automatic performance. For example, note data may consist of a single part or a plurality of parts. In the case where note data consist of a plurality of parts, lyric display data are preferably stored on the same track (or in the same part) as note data which are displayed to correspond to the lyric display data, in view of easiness of processing. However, the storage position of the lyric display data is not limited thereto, and the lyric display data may be stored on a different track. Note data and lyric data of each performance data set are stored in a single file. However, note data and lyric data may be stored in separate files. In this case, lyric data must contain information (e.g., timing data) indicating correspondence between each lyric section contained in the lyric data and each note contained in note data.

In the first through third embodiments, note data and lyric data are handled as different events. The data format is not limited thereto, and a data format in which lyric information is contained in the note event may be employed.

In the first through third embodiments, a description as to types of characters used in the lyric event is omitted. The type of characters is not limited to Hiragana, and any type of characters such as Kanji characters, numeric characters, or letters of the alphabet may be used.

In the first through third embodiments, after note display data and lyric display data are generated for all the performance data, musical score display is performed at a time on the basis of these data. However, musical score display may be performed in a step-by-step manner for each display change range on the basis of note display data and lyric display data which are in the process of being created.

Moreover, needless to say, the object of the present invention can be accomplished in the case where a recording medium on which are recorded program codes of software that realizes the functions of any of the above-described embodiments is supplied to a system or apparatus, and a computer (or a CPU or a MPU) of the system or apparatus is caused to read and execute the program codes stored on the recording medium. In such a case, the program codes themselves read from the recording medium realize the novel function of the present invention, and therefore, the recording medium storing the program codes constitutes the present invention.

Examples of the recording medium for supplying the program codes includes a flexible disk, a hard disk, a magneto-optical disk, CD-ROM, CD-R, CD-RW, DVD-ROM, DVD-RAM, DVD-RW, DVD+RW, magnetic tape, a nonvolatile memory card, and ROM. Further, the program codes may be supplied from a server computer via a communication network.

Needless to say, the present invention encompasses not only the case where the computer executes the read program codes, whereby the functions of the above-described embodiments are realized, but also the case where an OS, etc., operating on the computer performs a portion or the entirety of the actual processing in accordance with the instructions of the program codes, thereby realizing the functions of the above-described embodiments.

Furthermore, needless to say, the present invention encompasses the case where the program codes read from the recording medium are written in a memory provided in a function extension unit connected to the computer or a function extension board inserted into the computer; and a CPU or the like provided on the function extension unit or the function extension board performs a portion or the entirety of the actual processing in accordance with the instructions of the program codes, thereby realizing the functions of the above-described embodiments.

The musical score display apparatuses according to the first through third embodiments can be applied not only to electronic musical instruments, but also to karaoke apparatuses, game apparatuses, portable communication terminals such as cellular phones, and player pianos. In the case where the musical score display apparatuses are applied to the portable communication terminals, each terminal may contain all the necessary functions, or a server may have a portion of the functions, whereby the system including the terminals and the server realizes the necessary functions as a whole.

In the case where the musical score display apparatus assumes the form of an electronic musical instrument, the form of the electronic musical instrument is not limited to a keyboard instrument as described in the embodiments, and the electronic musical instrument may assume the form of a stringed instrument, a wind instrument, a percussion instrument, or the like. Further, the structure of the electronic musical instrument is not limited to a structure in which a tone generation unit, an automatic performance unit, etc., are contained in a single body, and the electronic musical instrument may have a structure in which these units are separate apparatuses which are connected via MIDI and communication means such as various networks.

Finally, the present invention can be practiced by making use of a general-purpose computer or the like in which a computer program or the like corresponding to any one of the above-described first through third embodiments is installed. In such a case, a computer program or the like corresponding to any one of the above-described first through third embodiments may be stored in a computer-readable recording medium, such as a CD-ROM or floppy disk, which is then provided to users.

What is claimed is:

1. A musical score display apparatus comprising:
   a musical score display portion for displaying, on a musical score, sections of a lyric represented by lyric data contained in performance data, together with notes represented by note data contained in the performance data such that the lyric sections and the notes are displayed in a mutually related manner;
   a section divider for dividing the musical score displayed by the musical score display portion into a plurality of sections in a time-axis direction;
   a section detector for detecting a section in which lyric sections would overlap each other when the lyric sections and the notes are displayed in the mutually related manner by the musical score display portion; and a display controller for controlling the display of the lyric sections and the notes performed by the musical score display portion, in such a manner that the lyric sections in the section detected by the section detector do not overlap.

2. A musical score display apparatus according to claim 1, further comprising:

a performance data storage device for storing the performance data; and a performance data read-out portion for reading out the performance data stored in the performance data storage device.

3. A musical score display apparatus according to claim 1, wherein the display controller extends the detected section to a degree such that the lyric sections in the section detected by the section detector do not overlap.

4. A musical score display apparatus according to claim 3, wherein the display controller comprises:

an extension ratio calculator for calculating an extension ratio for the detected section such that the lyric sections in the detected section do not overlap; and an extension controller for extending the detected section at the calculated extension ratio.

5. A musical score display apparatus according to claim 4, wherein the extension ratio calculator calculates the extension ratio in accordance with a difference in timing and an amount of overlap between two adjacent lyric sections.

6. A musical score display apparatus according to claim 4, wherein the extension ratio calculator calculates the extension ratio by gradually increasing the extension ratio.

7. A musical score display apparatus comprising:

a musical score display portion for displaying a musical score consisting of notes represented by note data contained in performance data;

a section divider for dividing the musical score displayed by the musical score display portion into a plurality of sections in a time-axis direction;

a section detector for detecting a section, among the plurality of sections, which section includes lyric data sets which would produce an overlapping display of lyric sections when sections of a lyric represented by lyric data contained in the performance data are displayed while being related to the corresponding notes of the displayed musical score; and a display controller for controlling the display of the lyric sections in such a manner that the lyric sections in the section detected by the section detector do not overlap.

8. A musical score display apparatus according to claim 7, further comprising:

a performance data storage device for storing the performance data; and performance data read-out portion for reading out the performance data stored in the performance data storage device.

9. A musical score display apparatus according to claim 7, wherein the musical score display portion comprises a note display controller for displaying the notes on the musical score in such a manner that the notes do not overlap.

10. A musical score display apparatus according to claim 7, wherein the display controller comprises a note display controller for controlling the display of the notes in such a manner that the notes are displayed while being related to the corresponding lyric sections.

11. A musical score display apparatus according to claim 7, wherein the display controller extends the detected section to a degree such that the lyric sections in the section detected by the section detector do not overlap.

12. A musical score display apparatus according to claim 11, wherein the display controller comprises:

an extension ratio calculator for calculating an extension ratio for the detected section such that the lyric sections in the detected section do not overlap; and an extension controller for extending the detected section at the calculated extension ratio.

13. A musical score display apparatus according to claim 12, wherein the extension ratio calculator calculates the extension ratio in accordance with a difference in timing or an amount of overlap between two adjacent lyric sections.

14. A musical score display apparatus according to claim 12, wherein the extension ratio calculator calculates the extension ratio by gradually increasing the extension ratio.

15. A musical score display apparatus comprising:

a section divider for dividing a displayed musical score into a plurality of sections in a time-axis direction when sections of a lyric represented by lyric data contained in performance data are displayed on the musical score;

a section detector for detecting a section, among the plurality of sections, which section includes lyric data sets which would produce an overlapping display of lyric sections;

a lyric display data creator for creating, for the lyric data contained in the detected section, lyric display data which eliminate the overlapping of the lyric sections;

a note display data creator for creating, for note data contained in the performance data, note display data on the basis of the created lyric display data, the note display data being used to display notes while relating the same to the corresponding lyric sections; and a musical score display portion for displaying the lyric sections and the notes on the musical score in a related manner, by making use of the created lyric display data and note display data, in such a manner that the lyric sections do not overlap.

16. A musical score display apparatus according to claim 15, further comprising:

a performance data storage device for storing the performance data; and a performance data read-out portion for reading out the performance data stored in the performance data storage device.

17. A musical score display apparatus according to claim 15, wherein the lyric display data creator creates lyric display data in such a manner that the section detected by the section detector is extended to a degree such that the lyric sections in the detected section do not overlap.

18. A musical score display apparatus according to claim 17, wherein the lyric display data creator comprises:

an extension ratio calculator for calculating an extension ratio for the detected section such that the lyric sections in the detected section do not overlap; and an extension controller for extending the detected section at the calculated extension ratio.

19. A musical score display apparatus comprising:

a musical score display portion for displaying, on a musical score, sections of a lyric represented by lyric data contained in performance data, together with notes represented by note data contained in the performance data such that the lyric sections and the notes are displayed in a mutually related manner;

an overlap position detector for detecting a position where lyric sections would overlap when the lyric sections are displayed to match the notes displayed by the musical score display portion; and a scroll controller for scroll-displaying a lyric section displayed at the position detected by the overlap position detector.

20. A musical score display apparatus according to claim 19, further comprising:

a performance data storage device for storing the performance data; and a performance data read-out portion for reading out the performance data stored in the performance data storage device.

21. A musical score display apparatus according to claim 19, wherein the musical score display portion comprises a note display controller for displaying the notes on the musical score in such a manner that the notes do not overlap.

22. A musical score display apparatus according to claim 19, wherein the scroll controller independently scrolls lyric sections in a plurality of sections of the musical score formed through division of the musical score.

23. A musical score display apparatus according to claim 19, further comprising a control object detector for detecting that the detected position has become a control object, wherein the scroll controller scrolls the lyric section displayed at the detected position in the case where the detected position has become a control object.

24. A musical score display apparatus according to claim 23, wherein the scroll controller independently scrolls lyric sections in a plurality of sections of the musical score formed through division of the musical score.

25. A method for displaying a musical score, being applied to a musical score display apparatus having a display unit on which the musical score is displayed, the method including:

a musical score display step for displaying, on the musical score, sections of a lyric represented by lyric data contained in performance data, together with notes represented by note data contained in the performance data such that the lyric sections and the notes are displayed in a mutually related manner;

a section division step for dividing the musical score displayed by the musical score display step into a plurality of sections in a time-axis direction;

a section detection step for detecting a section in which lyric sections would overlap each other when the lyric sections and the notes are displayed in the mutually related manner by the musical score display step; and a display control step for controlling the display of the lyric sections and the notes performed by the musical score display step, in such a manner that the lyric sections in the section detected by the section detection step do not overlap.

26. A method for displaying a musical score, being applied to a musical score display apparatus having a display unit, the method including:

a musical score display step for displaying the musical score consisting of notes represented by note data contained in performance data on the display unit;

a section division step for dividing the musical score displayed by the musical score display step into a plurality of sections in a time-axis direction;

a section detection step for detecting a section, among the plurality of sections, which section includes lyric data sets which would produce an overlapping display of lyric sections when sections of a lyric represented by lyric data contained in the performance data are displayed while being related to the corresponding notes of the displayed musical score; and a display control step for controlling the display of the lyric sections in such a manner that the lyric sections in the section detected by the section detection step do not overlap.

27. A method for displaying a musical score, being applied to a musical score display apparatus having a display unit on which the musical score is displayed, the method including:

a section division step for dividing the displayed musical score into a plurality of sections in a time-axis direction when sections of a lyric represented by lyric data contained in performance data are displayed on the musical score;

a section detection step for detecting a section, among the plurality of sections, which section includes lyric data sets which would produce an overlapping display of lyric sections;

a lyric display data creation step for creating, for the lyric data contained in the detected section, lyric display data which eliminate the overlapping of the lyric sections;

a note display data creation step for creating, for note data contained in the performance data, note display data on the basis of the created lyric display data, the note display data being used to display notes while relating the same to the corresponding lyric sections; and a musical score display step for displaying the lyric sections and the notes on the musical score in a related manner, by making use of the created lyric display data and note display data, in such a manner that the lyric sections do not overlap.

28. A method for displaying a musical score, being applied to a musical score display apparatus having a display unit on which the musical score is displayed, the method including:

a musical score display step for displaying, on the musical score, sections of a lyric represented by lyric data contained in performance data, together with notes represented by note data contained in the performance data such that the lyric sections and the notes are displayed in a mutually related manner;

an overlap position detection step for detecting a position where lyric sections would overlap when the lyric sections are displayed to match the notes displayed by the musical score display step; and a scroll step for scroll-displaying a lyric section displayed at the position detected by the overlap position detection step.

29. A computer-readable storage medium storing a computer program for displaying a musical score in a musical score display apparatus having a display unit for displaying a musical score, the computer program including:

a musical score display code for displaying, on the musical score, sections of a lyric represented by lyric data contained in performance data, together with notes represented by note data contained in the performance data such that the lyric sections and the notes are displayed in a mutually related manner;

a section division code for dividing the musical score displayed by the musical score display code into a plurality of sections in a time-axis direction;

a section detection code for detecting a section in which lyric sections would overlap each other when the lyric sections and the notes are displayed in the mutually related manner by the musical score display code; and a display control code for controlling the display of the lyric sections and the notes performed by the musical score display code, in such a manner that the lyric sections in the section detected by the section detection code do not overlap.

30. A computer-readable storage medium storing a computer program for displaying a musical score in a musical score display apparatus having a display unit for displaying a musical score, the computer program including:

a musical score display code for displaying the musical score, which consists of notes represented by note data contained in performance data on the display unit;

a section division code for dividing the musical score displayed by the musical score display code into a plurality of sections in a time-axis direction;

a section detection code for detecting a section, among the plurality of sections, which section includes lyric data sets which would produce an overlapping display of lyric sections when sections of a lyric represented by lyric data contained in the performance data are displayed while being related to the corresponding notes of the displayed musical score; and a display control code for controlling the display of the lyric sections in such a manner that the lyric sections in the section detected by the section detection code do not overlap.

31. A computer-readable storage medium storing a computer program for displaying a musical score in a musical score display apparatus having a display unit for displaying a musical score, the computer program including instructions for:

dividing the displayed musical score into a plurality of sections in a time-axis direction when sections of a lyric represented by lyric data contained in performance data are displayed on the musical score;

detecting a section, among the plurality of sections, which section includes lyric data sets which would produce an overlapping display of lyric sections;

creating, for the lyric data contained in the detected section, lyric display data which eliminate the overlapping of the lyric sections;

creating, for note data contained in the performance data, note display data on the basis of the created lyric display data, the note display data being used to display notes while relating the same to the corresponding lyric sections; and displaying the lyric sections and the notes on the musical score in a related manner, by making use of the created lyric display data and note display data, in such a manner that the lyric sections do not overlap.

32. A computer-readable storage medium storing a computer program for displaying a musical score in a musical score display apparatus having a display unit for displaying a musical score, the computer program including:

a musical score display code for displaying, on the musical score, sections of a lyric represented by lyric data contained in performance data, together with notes represented by note data contained in the performance data such that the lyric sections and the notes are displayed in a mutually related manner;

an overlap position detection code for detecting a position where lyric sections would overlap when the lyric sections are displayed to match the notes displayed by the musical score display code; and a scroll code for scroll-displaying a lyric section displayed at the position detected by the overlap position detection code.

* * * * *